US009970958B2

(12) United States Patent
Castellano et al.

(10) Patent No.: US 9,970,958 B2
(45) Date of Patent: May 15, 2018

(54) METHOD AND SYSTEM FOR COMPENSATING SYSTEMATIC NON-LINEARITIES OF A SIGNAL PROVIDED BY A CAPACITIVE INERTIAL SENSOR

(71) Applicant: STMICROELECTRONICS S.R.L., Agrate Brianza (IT)

(72) Inventors: Marco Castellano, Pavia (IT); Pierluigi Montinari, Milan (IT); Salvatore Poli, Milan (IT); Alessandro Tocchio, Gessate (IT); Giovanni Carlo Tripoli, Rho (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 431 days.

(21) Appl. No.: 14/672,575

(22) Filed: Mar. 30, 2015

(65) Prior Publication Data

US 2015/0323560 A1    Nov. 12, 2015

(30) Foreign Application Priority Data

May 6, 2014   (IT) .............................. TO2014A0362

(51) Int. Cl.
| | | |
|---|---|---|
| *G01P 21/00* | (2006.01) | |
| *G01C 25/00* | (2006.01) | |
| *G01P 15/125* | (2006.01) | |

(52) U.S. Cl.
CPC .............. *G01P 21/00* (2013.01); *G01C 25/00* (2013.01); *G01P 15/125* (2013.01)

(58) Field of Classification Search
None
See application file for complete search history.

(56) References Cited

U.S. PATENT DOCUMENTS

| | | | | |
|---|---|---|---|---|
| 2,926,247 | A * | 2/1960 | Palmer ...................... | G06F 7/62 235/132 E |
| 3,753,373 | A * | 8/1973 | Brown ...................... | G01K 7/34 323/364 |
| 3,900,721 | A * | 8/1975 | Speiser ................... | G06F 17/14 708/400 |
| 7,194,376 | B2 * | 3/2007 | Zarabadi ............... | G01P 15/125 702/127 |
| 7,839,214 | B2 * | 11/2010 | Ru ........................ | H04W 52/14 330/149 |

(Continued)

OTHER PUBLICATIONS

Voldman, J., "Case Study: A Capacitive Accelerometer", Massachusetts Institute of Technology, 2007.*

(Continued)

*Primary Examiner* — Joseph Schoenholtz
(74) *Attorney, Agent, or Firm* — Seed IP Law Group LLP

(57) ABSTRACT

A method for compensating non-linearities of a read signal generated by a variable-capacitance inertial sensor including a first fixed electrode and a second fixed electrode and a mobile electrode, which is spatially arranged between the first and second fixed electrodes and is capacitively coupled to the first and second fixed electrodes, said method comprising the steps of: acquiring the read signal; identifying a first linear component and at least one first nonlinear component of the read signal; a generating a compensated output signal by subtracting the first nonlinear component from the read signal.

12 Claims, 4 Drawing Sheets

(56) References Cited

U.S. PATENT DOCUMENTS

| | | | |
|---|---|---|---|
| 2005/0240374 A1* | 10/2005 | Zarabadi | G01P 15/125 702/141 |
| 2006/0156810 A1 | 7/2006 | Brett et al. | |
| 2006/0185433 A1 | 8/2006 | Leonardson et al. | |
| 2010/0007415 A1* | 1/2010 | Ru | H04W 52/14 330/149 |
| 2012/0116707 A1* | 5/2012 | Malvern | G01P 15/125 702/104 |
| 2013/0006559 A1* | 1/2013 | Grosjean | G01D 3/032 702/65 |

OTHER PUBLICATIONS

Anthony, S., "The first human brain-to-brain interface has been created. in the future will we all be linked telepathically?" Sep. 3, 2014, downloaded from URL< https://www.extremetech.com/extreme/188883-the-first-human-brain-to-brain-interface-has-been-created-in-the-future-will-we-all-be-linked-telepathically> on Sep. 21, 2017.*

Bosch Sensortec, "BMA250: Digital, triaxial acceleration sensor," Data Sheet, Bosch, 74 pgs., May 31, 2012.

* cited by examiner

METHOD AND SYSTEM FOR COMPENSATING SYSTEMATIC NON-LINEARITIES OF A SIGNAL PROVIDED BY A CAPACITIVE INERTIAL SENSOR

BACKGROUND

Technical Field

The present disclosure relates to a method and system for compensating systematic non-linearities in a signal supplied by a capacitive inertial sensor, in particular an inertial micro-electromechanical (MEMS) sensor, such as for example an accelerometer.

Description of the Related Art

Known in the prior art are inertial-measurement units or systems typically comprising an acceleration sensor (accelerometer) having one or more (e.g., three) sensing axes X, Y, Z, designed to measure movements (accelerations) to which the accelerometer is subject during use with respect to the Earth's reference system. Other inertial measurement systems, such as gyroscopes, are available in the prior art.

MEMS technology has favored miniaturization of accelerometers. Schematically and by way of example, an inertial sensor of a known type includes one or more fixed parts (also referred to as fixed masses, or stators) and a mobile mass (rotor). The rotor is capacitively coupled to the stators so that it forms one or more capacitors with each stator. In other words, the stators and the rotor form the respective plates of one or more capacitors. The signal of variation of capacitance of said capacitors indicates a displacement of the rotor with respect to the stator and generates the output signal of the inertial sensor, which indicates the acceleration to which the rotor is subject during use of the accelerometer.

At the end of the manufacturing steps, the inertial sensor is calibrated so for making up, at least in part, for systematic errors generated by the manufacturing process. In particular, a factor that affects the output signal of the inertial sensor is the misalignment of the mobile mass (rotor) with respect to the ideal position that it should occupy with respect to the fixed parts (stators). In particular, according to a known embodiment, stator electrodes (e.g., two stator electrodes) constitute as many plates of respective capacitors, whereas a rotor electrode constitutes a common plate of said capacitors; in this case, the rotor electrode is spatially arranged between the stator electrodes.

In ideal manufacturing conditions, the plate that forms the rotor electrode is spaced at equal distances apart from the plates that form the stator electrodes so that the respective capacitors show, in conditions of rest, a same value of capacitance. However, in real cases, there may exist an undesirable misalignment on account of which said capacitors show, in conditions of rest, a different value of capacitance. When the inertial sensor operates as differential capacitive sensor, the output signal is given by the difference of variation of capacitance of the two capacitors formed by the stator electrodes with the rotor electrode. It is evident that, in the case of the aforementioned manufacturing errors, an undesirable misalignment of said electrodes causes a nonzero output signal also in conditions of rest and further introduces a deterioration of the performance of nonlinearity of the output signal. In particular, in the presence of a marked initial misalignment of the position of the rotor towards the stators, for high values of acceleration there is a markedly nonlinear behavior of the output signal (of a parabolic type). Said behavior is undesirable in the majority of applications in which accelerometers are used.

BRIEF SUMMARY

Some embodiments of the present disclosure are a method and a system for compensating non-linearities in a signal supplied by a capacitive inertial sensor that will be able to overcome the drawbacks of the known art.

BRIEF DESCRIPTION OF THE SEVERAL VIEWS OF THE DRAWINGS

According to the present disclosure, a method and a system are provided for compensating non-linearities in a signal supplied by a capacitive inertial sensor.

For a better understanding of the present disclosure, preferred embodiments thereof are now described, purely by way of non-limiting example and with reference to the attached drawings, wherein.

DETAILED DESCRIPTION

Figure 1:
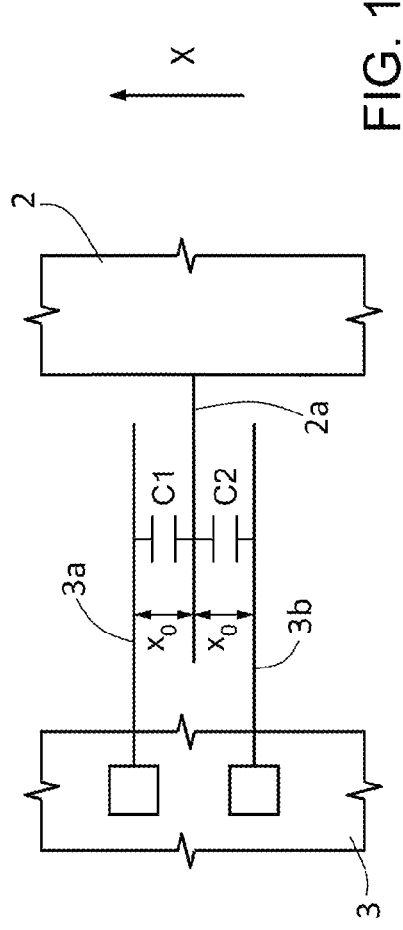
FIG. 1 shows, in schematic form, a sensor module of an inertial sensor of a known type including electrodes of a fixed mass and an electrode of a mobile mass.

An inertial sensor, for example an accelerometer, is a micro-electromechanical structure comprising one or more sensor modules of the type illustrated by way of example in FIG. 1. With reference to FIG. 1, the sensor module comprises at least one mobile mass (also referred to as "rotor") 2, and a fixed structure (also referred to as "stator") 3. Typically, the mobile mass 2 is mechanically connected to the fixed structure 3 by springs and is mobile with respect to the fixed structure 3 according to pre-set degrees of freedom. The mobile mass 2 is further electrically coupled to the fixed structure 3 via capacitive structures (capacitors $C_1$ and $C_2$).

The mobile mass 2 includes an electrode 2a, and the fixed structure 3 includes a first electrode 3a and a second electrode 3b. The electrode 2a is arranged between the electrodes 3a and 3b, respectively, for forming a capacitive structure with planar parallel plates. In this example, the capacitive coupling is of a differential type, obtained by parallel-plate electrodes perpendicular to the sensing direction (here the sensing direction shown is the direction X). The movement in the direction X of the mobile mass 2 with respect to the fixed body 3, for example on account of an external stress, modifies the capacitance of the capacitors $C_1$ and $C_2$. By detecting the variation of differential capacitance of the capacitors $C_1$ and $C_2$ it is possible to trace back to the relative displacement of the mobile mass 2 with respect to the fixed structure 3 and thus to the acceleration to which the inertial sensor, which integrates the mobile mass 2 and the fixed body 3, is subject during use. Instead, by supplying appropriate biasing voltages, it is possible to apply an electrostatic force to the mobile mass 2 to arrange it in motion, in particular at a certain resonance frequency ω. In this case, the inertial sensor comprises a driving device (not illustrated), which has the task of keeping the mobile mass 2 in oscillation. For instance, in a per se known manner, it is possible to supply, in open loop, periodic stresses at the resonance frequency ω of the mobile mass 2. Alternatively, it is possible to use feedback driving circuits, based upon the use of sigma-delta modulators. Other solutions are further possible.

Figure 2:
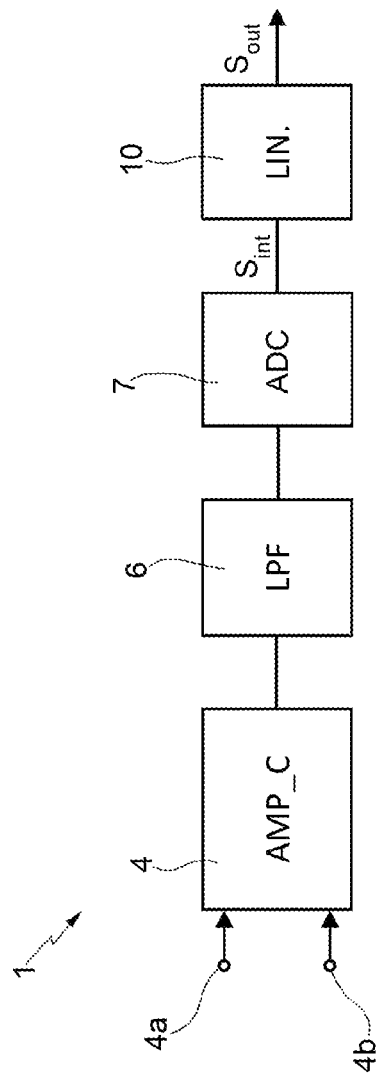
FIG. 2 shows a stage for reading a differential capacitive signal generated by the sensor module of FIG. 1 and including a system for compensating non-linearities according to the present disclosure.

FIG. 2 shows schematically a reading system 1 including a chain for processing the signal supplied by the inertial sensor, in particular for analog-to-digital conversion of said signal and for compensation of non-linearities, according to one embodiment of the present disclosure. For instance, the reading system 1 is integrated in an application-specific integrated circuit (ASIC) (here not illustrated). The reading system 1 comprises a charge amplifier AMP_C 4, a lowpass filter LPF 6 for filtering possible noise components and for limiting the band of the signal supplied by the inertial sensor, and an analog-to-digital conversion stage ADC 7, cascaded together. The charge amplifier AMP_C 4 is, for example, of a fully differential switched-capacitor type. The charge amplifier AMP_C 4 has inputs 4a, 4b connected to the terminals of the mobile mass 2. According to the operation of the charge amplifier AMP_C 4, present on its outputs are read voltages indicating displacement of the mobile mass 2.

The output of the charge amplifier AMP_C 4 is supplied to the filter LPF 6 and then to the analog-to-digital conversion stage ADC 7, which makes a conversion of the signal received at input into a digital word, in a known way, for example on a number of bits comprised between 8 and 16. The charge amplifier AMP_C 4, the filter LPF 6 and the analog-to-digital conversion stage ADC 7 are known and already used in the chain for reading and processing the signal supplied by an inertial sensor, such as an accelerometer. These elements are consequently not described in detail.

According to one aspect of the present disclosure, the reading stage 1 further comprises a linearization block 10 operatively coupled to the output of the analog-to-digital conversion stage ADC 7.

At output from the inertial sensor, in the case provided by way of example of a triaxial inertial sensor, three signals are generated, one for each sensing axis X, Y, Z. In this case, the processing performed by the blocks of FIG. 2 is executed for each of the signals supplied at output by the inertial sensor, selected by a multiplexer (e.g., with time multiplexing, not illustrated in FIG. 2) present upstream of the charge amplifier AMP_C 4. In the case of an inertial sensor having just one sensing axis, the multiplexer is not necessary.

Alternatively, once again in the case of multiaxial (e.g., triaxial) inertial sensor, it is possible to envisage three read systems of the type illustrated in FIG. 2, one for each signal generated for a respective axis.

According to what is illustrated in FIG. 2, the linearization block 10 receives at input the signal $S_{int}$ converted by the analog-to-digital conversion stage 7 (e.g., a digital word) and performs an operation of linearization of said signal to generate at output a signal $S_{out}$.

The differential capacitive signal supplied at output from the inertial sensor is affected by non-linearities. This effect is all the more evident, the more the mobile mass 2 of the inertial sensor is subject to misalignments (offsets) along X with respect to the ideal position that it should assume, i.e.,
evenly spaced apart, along X, from the electrodes of the fixed structure 3. This may happen on account of imperfections introduced during the manufacturing process. On account of these imperfections, the signal supplied at output from the inertial sensor presents a parabolic shape.

Figure 3:
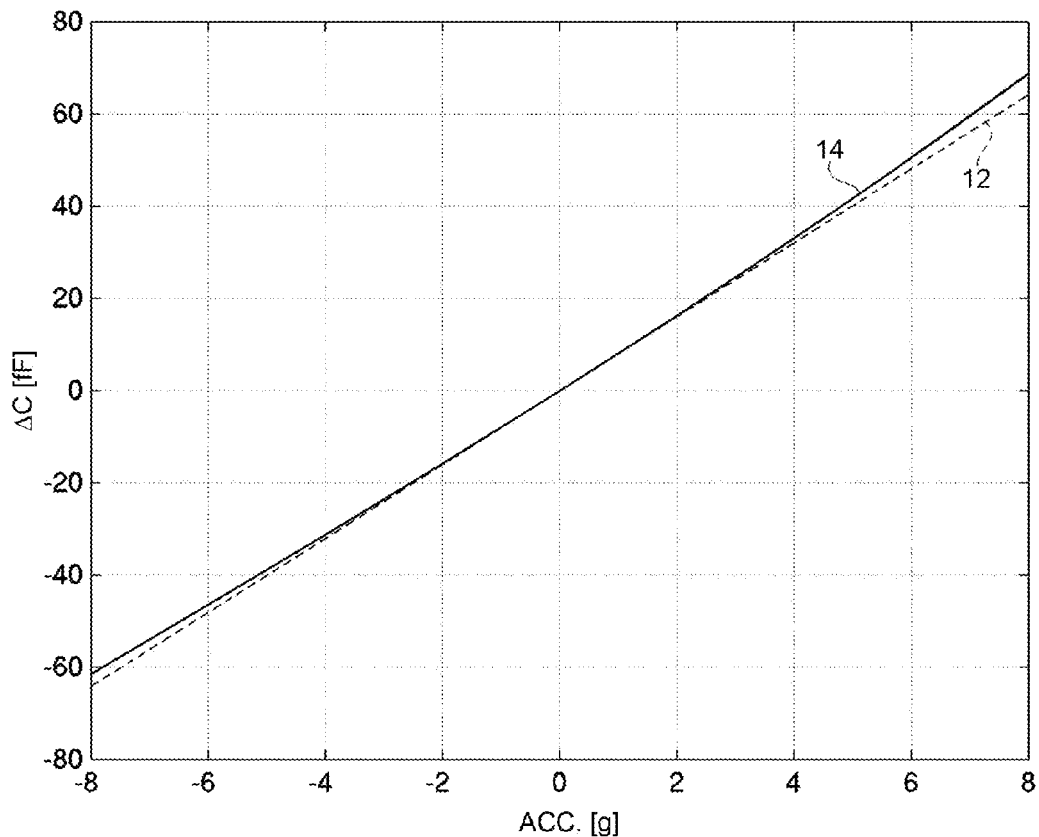
FIG. 3 shows the variation of a differential-capacitance signal generated by an inertial sensor including one or more sensor modules according to FIG. 1 as the acceleration to which the mobile-mass electrode is subject during use varies.

Reference may be made, for example, to FIG. 3, which shows, designated by the reference number 12, an ideal curve (desired linear plot), and by the reference number 14 a real curve that illustrates a signal at output from the inertial sensor, regarding a sensing axis (e.g., axis X). The reference system of FIG. 3 shows, on the axis of the abscissae, values of acceleration to which the mobile mass of the inertial sensor is subject (the value 0 means no acceleration), whereas present on the axis of the ordinates are the values, expressed in femtofarads, of variation of differential capacitance between the stator electrodes 3a, 3b and the rotor electrode 2a. The scale of the axis of the abscissae is made in units g of acceleration of gravity from −8 g to +8 g.

In this example, both of the curves are normalized in such a way that corresponding to a zero value of acceleration is a zero value of differential capacitance.

As may be noted, the real curve 14 is deviates from the ideal curve 12, in particular for high values (in module) of acceleration, presenting a plot of a parabolic type, in particular between 4 g and 8 g.

The variation of differential capacitance ΔC between the electrode 2a of the mobile mass 2 and the electrodes 3a, 3b of the fixed structure 3 is given, in a known way, by the following formula (1):

$$\Delta C = \frac{\varepsilon_0 N A_i}{(x_0 - x)} - \frac{\varepsilon_0 N A_i}{(x_0 + x)} \tag{1}$$

where: $\varepsilon_0$ is the dielectric constant, or electrical permittivity, of vacuum; $A_i$ is the value in square meters of the area of the stator electrode 3a (or electrode 3b, which are assumed as having identical areas) directly facing the rotor electrode 2a; N is the number of plane-plate electrodes belonging to the fixed structure 3 (with reference to FIG. 1, N=2); $x_0$ is the ideal (desired) distance (see FIG. 1), considered along the sensing axis X, between one electrode 3a, 3b and the electrode 2a; and x is the displacement, measured in meters, of the electrode 2a with respect to the condition of rest during use.

When possible manufacturing imperfections are considered whereby the electrode 2a of the mobile mass 2 does not occupy an ideal position perfectly symmetrical between two respective electrodes 3a, 3b of the fixed structure 3, but is shifted by an amount $x_{offset}$ approaching one of the two electrodes 3a, 3b (and moving away from the other between the electrodes 3a, 3b), then Eq. (1) assumes the following form (2):

$$\Delta C = \frac{\varepsilon_0 A}{(x_0 - x_{offset} - x)} - \frac{\varepsilon_0 A}{(x_0 + x_{offset} + x)} \tag{2}$$

where the error $x_{offset}$ has been introduced, and, for simplicity, A is the numeric value of $N \cdot A_i$ identified in Eq. (1).

The value $x_{offset}$ is an error and varies, obviously, on the basis of the manufacturing process. However, once a certain process of production of the inertial sensor is set, it is possible to estimate (for example, by simulation or tests) a mean value of $x_{offset}$, which is thus known (or estimated) at the end of the manufacturing process.

Thus, once a value $x_{offset}$ is fixed, it is possible to calculate numerically the value of $\Delta C$ according to Eq. (2). The value of x may for example be the zero value (zero acceleration), or else a value calculated considering a value of acceleration a provided by way of example, according to Eq. (3):

$$x = \frac{9.81}{\omega^2} a \quad (3)$$

where ω is the resonance frequency (which is known) chosen for the mobile mass, 9.81 is the acceleration of gravity, and a is a value of acceleration to which the inertial sensor is subjected along the sensing axis considered (in this example, X).

Eq. (2) may be approximated by a polynomial expansion of partial derivatives up to the third order, of the type illustrated in the following Eq. (4):

$$\Delta C(x) = \frac{\partial \Delta C}{\partial x} x + \frac{1}{2} \frac{\partial^2 \Delta C}{\partial x^2} x^2 + \frac{1}{6} \frac{\partial^3 \Delta C}{\partial x^3} x^3 \quad (4)$$

Eq. (4) approximates the continuous and x-differentiable function $\Delta C(x)$ according to Eq. (2), and may be represented generically with a polynomial of an arbitrary degree n (i.e., a degree other than the third degree, for example the second degree, or a degree higher than the third). In particular, Eq. (4) represents a development in Taylor series or, more precisely, a McLaurin development, where the partial derivatives are calculated in a pre-set point x (for example, as has been said, x=0).

We have that Eq. (4) may be expressed in the following Eq. (5):

$$\Delta C(x) = \alpha x + \beta x^2 + \gamma x^3 \quad (5)$$

where α is the first derivative of $\Delta C(x)$; β is the second derivative, divided by the factor 2, of $\Delta C(x)$; and γ is the third derivative, divided by the factor 6, of $\Delta C(x)$. All the terms α, β, and γ have a value that is a function of the ideal value $_{x0}$ and of the value of the error $x_{offset}$. Eq. (5) represents a third-order equation, where αβ and γ are the coefficients of the equation.

It is desirable to compensate, or annul, the nonlinear terms of Eq. (5) (i.e., the terms β·$x^2$ and γ·$x^3$), in such a way as to obtain a value of variation of capacitance $\Delta C(x)$ that is a function exclusively of the linear term α·x. The desired variation of capacitance is consequently the following $\Delta C_{corr}$ expressed by Eq. (6):

$$\Delta C_{corr}(x) = \alpha x \quad (6)$$

wherein we obtain x from Eq. (7):

$$x = \frac{\Delta C_{corr}(x)}{\alpha} \quad (7)$$

Substituting the expression of x according to Eq. (7) in Eq. (5), the following Eq. (8) is obtained:

$$\Delta C_{corr}(x) = \Delta C(x) - \frac{\beta}{\alpha^2} \Delta C_{corr}(x)^2 - \frac{\gamma}{\alpha^3} \Delta C_{corr}(x)^3 \quad (8)$$

From Eq. (8) it may be noted that:

(i) the values of α, β, and γ may be calculated numerically by computing the partial derivative with respect to x of the formula of $\Delta C$ according to Eq. (2), where the value $x_{offset}$ is estimated or measured experimentally, and the value x is set at a predetermined value, in particular the zero value; the other values of Eq. (2) are known in so far as they are design parameters of the inertial sensor; and (ii) the value of $\Delta C_{corr}$ is unknown.

Consequently, since $\Delta C_{corr}$ is unknown, the following simplification of Eq. (8) is made:

$$\Delta C_{corr}(X) = \Delta C(x) - B\Delta C(x)^2 - C\Delta C(x)^3 \quad (9)$$

where $\Delta C(x)$ is the variation of instantaneous capacitance of the microstructure formed by the rotor electrode and by the stator electrodes; in other words, $\Delta C(x)$ is a differential-voltage signal indicating the displacement of the mobile mass 2 along the corresponding sensing axis (here, X) in the instant considered.

The values of B and C of Eq. (8) are given by B=β/$\alpha^2$ and C=γ/$\alpha^3$. Since, as has been said, α, β, and γ may be calculated numerically, the values of B and C may be determined.

A numeric non-limiting example of the present disclosure is now provided for calculation of the coefficients α, β and γ, and thus of B and C. On the basis of what has been set forth previously, we have that the expressions of α, β and γ are expressed by the following Eqs. (10a-10c):

$$\alpha = \frac{(x_0 + x_{offset})^2 + (x_0 - x_{offset})^2}{(x_0 + x_{offset})^2 \cdot (x_0 - x_{offset})^2} \cdot \varepsilon_0 A \quad (10a\text{-}10c)$$

$$\beta = \frac{(x_0 + x_{offset})^3 - (x_0 - x_{offset})^3}{(x_0 + x_{offset})^3 \cdot (x_0 - x_{offset})^3} \cdot \varepsilon_0 A$$

$$\gamma = \frac{(x_0 + x_{offset})^4 + (x_0 - x_{offset})^4}{(x_0 + x_{offset})^4 \cdot (x_0 - x_{offset})^4} \cdot \varepsilon_0 A$$

Considering that $\varepsilon_0 = 8.85 \cdot 10^{-12}$ and assuming the following values: A=9.6·$10^{-8}$ $m^2$, $x_{offset}$=100·$10^{-9}$ m, $_{x0}$=2·$10^{-6}$ m, and zero acceleration (x=0), we have: α=4.28·$10^{-7}$ F/m, β=0.0327 F/$m^2$, γ=1.0888·105 F/$m^3$. Thus, we obtain the values of B and C, i.e., B=1.7538·$10^{11}$ $F^{-1}$ and C=1.3887·$10^{24}$ $F^{-2}$.

According to a further embodiment of the present disclosure, in order to improve the effect of linearization (e.g., of the curve 14 of FIG. 3) it is possible to act also on the parameter $x_0$. In fact, even though $x_0$ is known from the design of the inertial sensor, its effective value may vary on account of process spread. Thus, estimating that the effective value of $x_0$ varies, for a given manufacturing process, in a range $x_0 \pm x_0'$ (with $x_0'$ equal to a fraction of $x_0$), it is possible to calculate the coefficients B and C for a plurality of values of $x_0$ included in the range $x_0 \pm x_0'$ considered. The value of $x_0$ to be used for calculation of the coefficients B and C will be that value such that the best linearization of the curve considered is obtained (e.g., of the curve 14 of FIG. 3). For this purpose, according to one embodiment of the disclosure, to find the optimal coefficients B and C as $x_0$ varies, it is possible to use a method based upon the Monte Carlo algorithm. In this way, it is possible to obtain a solution to the problem of linearization of the curve of the signal $\Delta C$.

Furthermore, according to a further embodiment, the values of B and C may be obtained by tests and simulations, choosing those values that, substituted in Eq. (9), enable a signal $\Delta C_{corr}$ to be obtained that approximates a straight line (e.g., the straight line 12 of FIG. 3).

To return to FIG. 2, we have that the linearization block 10 (illustrated in FIG. 4 according to one embodiment) digitally implements Eq. (9) in such a way as to process the signal $S_{int}$ that it receives at input, to generate at output a signal $S_{out}$ equal to $$S_{out} = S_{int} - (B' \cdot S_{int}^2 + C' \cdot S_{int}^3) \quad (11)$$

Here, $S_{int}$ is a signal representing the differential-capacitance signal $\Delta C(x)$, represented in digital format. Likewise, also the values of B' and C' of Eq. (11) are values correlated to the values of B and C referred to previously, but expressed in digital format so that they may be appropriately processed by the linearization block 10, which, as has been said, operates on digital signals according to one embodiment of the present disclosure.

Figure 4:
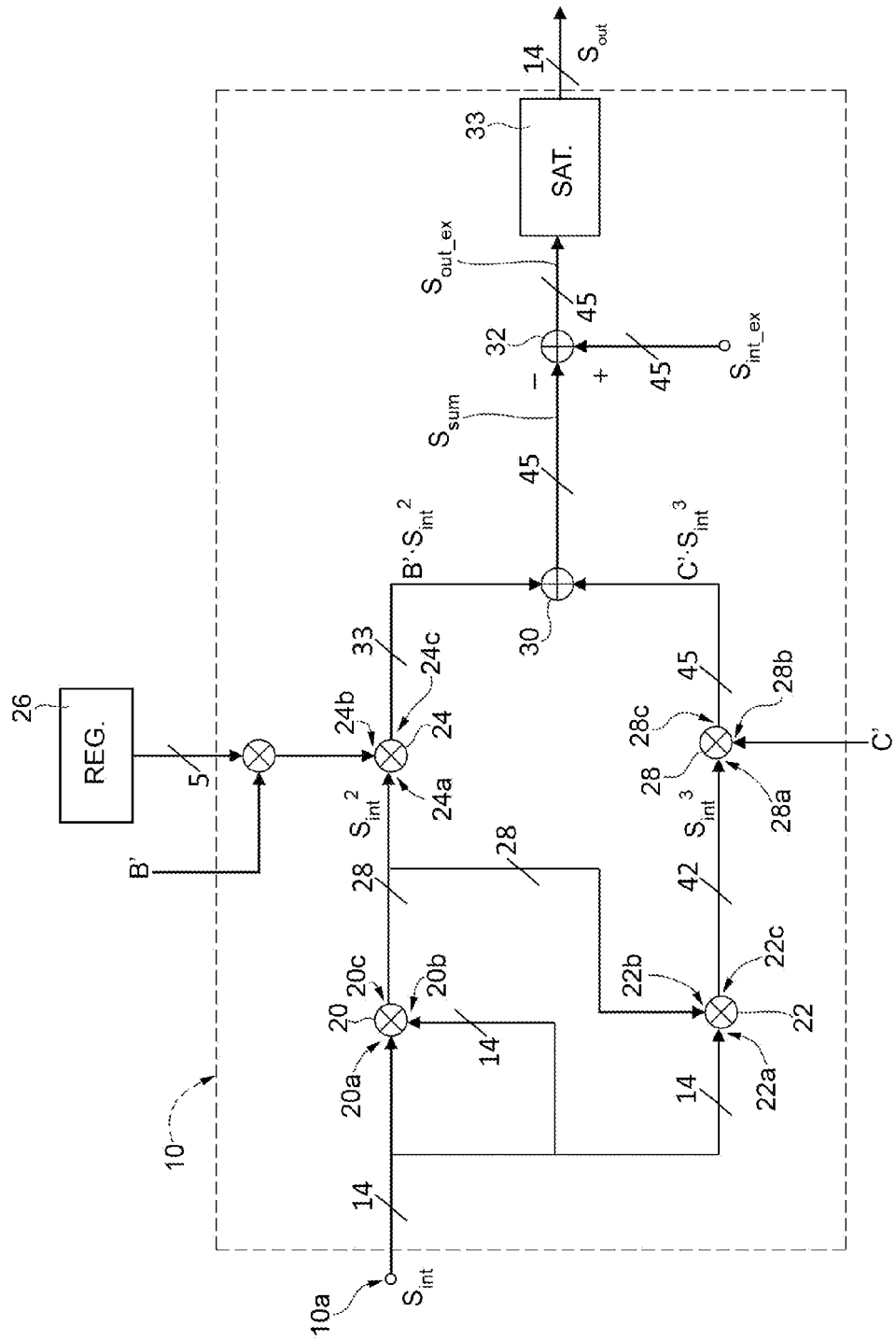
FIG. 4 shows, according to one embodiment of the present disclosure, a digital circuit for compensating non-linearities of a differential capacitive signal generated by the sensor module of FIG. 1.

FIG. 4 is a schematic illustration of a possible implementation via logic blocks of the linearization block 10, which implements the linearization according to Eq. (11).

In detail, the linearization block 10 includes an input 10a, which receives the signal $S_{int}$, of a digital type. The signal $S_{int}$ is represented on a number of bits defined as required, for example on the basis of the resolution of the ADC converter 7 of FIG. 2, for instance comprised between 8 bits and 16 bits (but any other value may be used). In this example, the signal $S_{int}$ is represented on 14 bits. The signal $S_{int}$ is supplied simultaneously to a first input 20a and to a second input 20b of a multiplier 20; the latter performs an operation of squaring of the signal $S_{int}$, supplying on the output 20c the signal $S_{int}^2$, represented on 28 bits (i.e., on a number of bits twice that of the bits of the signal $S_{int}$).

Furthermore, the signal $S_{int}$ is supplied to the input 22a of a further multiplier 22; a second input 22b of the multiplier 22 receives the signal $S_{int}^2$. The multiplier 22 supplies at output a signal that is the signal $S_{int}^2$ multiplied by the signal $S_{int}$, i.e., the signal $S_{int}$ cubed, $S_{int}^3$. The signal $S_{int}^3$ is represented on a number of bits that is three times the number of bits on which the signal $S_{int}$ is represented.

This is followed by multiplication of the signal $S_{int}^2$ by the coefficient B' and multiplication of the signal $S_{int}^3$ by the coefficient C'.

For this purpose, the signal $S_{int}^2$ is supplied to an input 24a of a multiplier 24; the latter receives on a further input 24b the coefficient B' and supplies at output 24c a signal that is $B' \cdot S_{int}^2$ and may be represented on 33 bits.

According to one embodiment of the present disclosure, the coefficient B' is a power of 2 (digital word) represented on a number of bits chosen as required. For instance, 20 bits are sufficient for representing in digital format the value of B referred to previously. To be able to modify or update the value of B', according to one embodiment of the present disclosure, a memory, or register, for example of a Flash type, 26 is present, which is accessible outside the linearization block 10. The register 26 stores a value, for example on 5 bits, which is to be multiplied by the value of the coefficient B' for supplying to the multiplier 24 a value of the coefficient B' that may be updated as required.

In general, the value of the coefficient B' may be modified or updated, for example to carry out operations of re-calibration of the inertial sensor. The signal generated by the inertial sensor, in fact, may undergo variations or drift during the operating life of the sensor. To guarantee a linear output signal $S_{out}$ in each stage of operating life of the sensor, it is possible to vary the value of the coefficient B' in such a way as to restore the condition of linearity required for the output signal $S_{out}$.

By a further multiplier 28 the next step, as has been said, is multiplication of the signal $S_{int}^3$ by the coefficient C'. For this purpose, the signal $S_{int}^3$ is supplied to an input 28a of the multiplier 28; the latter receives the coefficient C' on a further input 28b.

The multiplier 28 supplies at output 28c a signal that is $C' \cdot S_{int}^3$, here represented on 45 bits.

The coefficient C' is also a power of 2 (digital word), for example represented on 35 bits, which are sufficient for representing, in digital format, the coefficient C referred to previously.

An adder 30 receives at input the signals $B' \cdot S_{int}^2$ and $C' \cdot S_{int}^3$, and supplies at output a signal that is the sum of the inputs, i.e., the signal $S_{SUM} = B' \cdot S_{int}^2 + C' \cdot S_{int}^3$. The signal $S_{SUM}$ is represented on 45 bits, i.e., on the number of bits of the signal $C' \cdot S_{int}^3$.

This is followed by a step of subtraction by a subtractor 32, to implement the operation of subtraction between the signal $S_{int}$ at input to the linearization block 10 and the signal $S_{SUM}$ represented by Eq. (11), mentioned previously. In order to have uniformity of representation in bits, the signal $S_{int}$ (originally on 14 bits) is represented on 45 bits before being set at input to the subtractor 32. The signal $S_{int}$ represented on 45 bits is denoted in FIG. 4 as $S_{int\_ex}$. Thus, the subtractor 32 receives at input both of the signals $S_{int\_ex}$ and $S_{SUM}$, and performs the operation $S_{int\_ex} - S_{SUM} = S_{int\_ex} - (B' \cdot S_{int}^2 + C' \cdot S_{int}^3) = S_{int} - (B' \cdot S_{int}^2 + C' \cdot S_{int}^3)$.

The signal $S_{out\_ex}$ at output from the subtractor 32 is again represented on 45 bits. However, following upon the operation of subtraction, the information carried by the signal $S_{out\_ex}$ may once again be represented on the same number of bits (14 bits) as the signal $S_{int}$ at input to the linearization block 10. This is thus followed by an operation of saturation, via the block 33, for generating at output from the linearization block 10 an output signal $S_{out}$ represented on 14 bits or, more in general, on the same number of bits as that with on which the input signal $S_{int}$ is represented.

The linearization block 10 of FIG. 4 uses digital multipliers, adders, and subtractors, and performs the operation of linearization according to Eq. (11) described previously.

The values of the digital signals described with reference to FIG. 4 are preferably represented by floating-point or fixed-point numbers. This representation, however, requires a greater capacity and processing complexity than do integers. To reduce the processing complexity it is possible, according to one embodiment, to make a conversion from decimal-point values to integer values. An evaluation should, however, be made on a case-by-case basis to make sure that the loss of precision is negligible.

Figure 5:
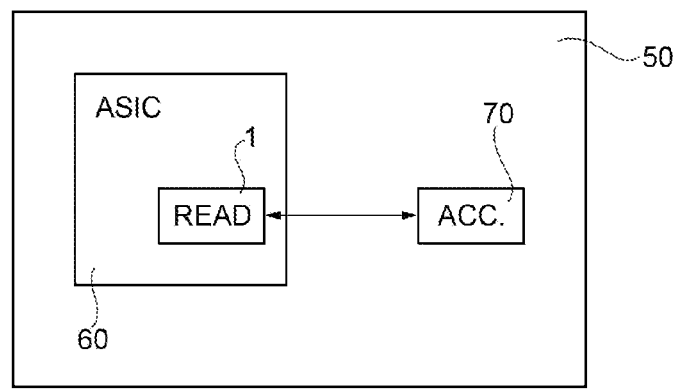
FIGS. 5 and 6 show respective electronic devices including an inertial sensor provided with a sensor module of the type illustrated in FIG. 1 and a digital circuit for compensating non-linearities of the type illustrated in FIG. 4.

FIG. 5 shows a chip, designated as a whole by the reference number 50, a die that carries an ASIC 60, and a die that carries an inertial-measurement sensor 70, for example an accelerometer, which for instance includes one or more sensor modules of the type illustrated in FIG. 1. The inertial sensor 70 is operatively coupled to the ASIC 60 to provide an acceleration signal in the form of a differential capacitive signal. The ASIC 60 is provided with a reading stage 1 of the type illustrated in FIG. 2, i.e., including the linearization block 10, according to the present disclosure. To implement the steps of the linearization method described previously, the linearization block 10 includes a logic circuit of the type illustrated with reference to FIG. 4, or else a microprocessor configured to implement the operations of the circuit of FIG. 4, for example by executing instructions defined by a software program.

In detail, the accelerometer 70 generates acceleration signals for each sensing axis (e.g., one, two, or three axes), in its own reference system. Each of said acceleration signals is a respective differential-voltage signal ΔC(x), of the type previously illustrated (one for each axis), where each signal $S_{int}=\Delta C(x)$ is processed by the linearization block 10 independently of the signals regarding the other measuring axes (in a respective time interval), for example under the control of a multiplexer.

Figure 6:
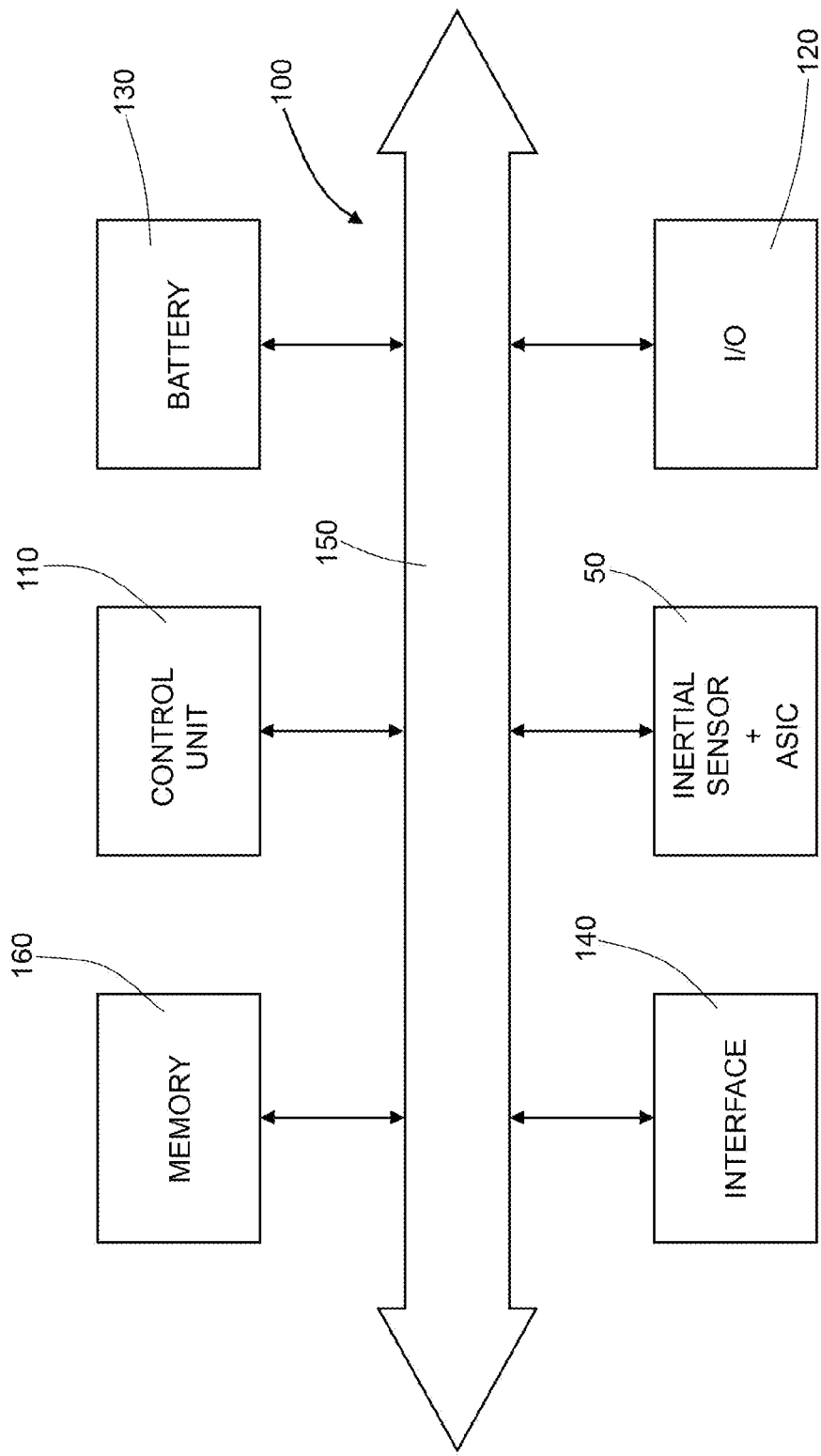

Illustrated in FIG. 6 is a portion of an electronic system 100 according to a further embodiment. The system 100 incorporates the chip 50 of FIG. 6 and may be used in devices, such as, for example, a palmtop computer (personal digital assistant, PDA), laptop computer or portable computer, possibly with wireless capacity, a cellphone, a messaging device, a digital music player, a digital camera or other devices designed to process, store, transmit, or receive information. For instance, the chip 50 may be used in a digital camera for detecting movements and stabilizing an image. In other embodiments, the chip 50 is included in a portable computer, a PDA, or a cellphone for detecting a free-fall condition and activating a safety configuration. In a further embodiment, the chip 50 is included in a motion-activated user interface for computers or consoles for video games. In a further embodiment, the chip 50 is incorporated in a satellite-navigation device and is used for temporary tracking of position in the case of loss of the satellite positioning signal.

The electronic system 100 may comprise, in addition to the chip 50, a controller 110, an input/output (I/O) device 120 (for example, a keyboard or a screen), a wireless interface 140, and a memory 160, of a volatile or nonvolatile type, coupled together through a bus 150. In one embodiment, a battery 180 may be used for supplying the system 100. It is to be noted that the scope of the present disclosure is not necessarily limited to embodiments having one or all of the devices listed.

The controller 110 may comprise, for example, one or more microprocessors, microcontrollers, and the like.

The I/O device 120 may be used for generating a message. The system 100 may use the wireless interface 140 for transmitting and receiving messages to and from a wireless communication network with a radiofrequency (RF) signal. Examples of wireless interface may comprise an antenna, a wireless transceiver, such as a dipole antenna, even though the scope of the present disclosure is not limited from this point of view. Furthermore, the I/O device 120 may supply a voltage representing what is stored either in the form of digital output (if digital information has been stored) or in the form of analog output (if analog information has been stored).

Finally, it is evident that modifications and variations may be made to the resonant micro-electromechanical system described, without thereby departing from the scope of the present disclosure.

For instance, the reading stage 1 of FIG. 2 may further comprise an anti-aliasing filter arranged downstream of the ADC stage 7.

Furthermore, the disclosure may advantageously be integrated in the signal-reading stage of capacitive electromechanical oscillators of a type different from what has been described (for example, of a non-differential type).

Furthermore, it is possible to use one or more clock signals, in particular for driving the mobile mass and for synchronizing the steps described for processing (linearization) of the signal $S_{int}$ (see FIG. 4). In this connection, it is possible to generate clock signals using just one main clock signal supplied by an asynchronous oscillator calibrated at the driving frequency.

The advantages of the present disclosure and of the corresponding manufacturing method emerge clearly from the foregoing description.

In particular, the present disclosure enables execution of an on-chip compensation/linearization of the output signal of the inertial sensor in a fast and inexpensive way, in particular integrating a low-cost hardware/software engine directly within the ASIC.

The method according to FIG. 4 does not require high computing capacity and expensive hardware. Furthermore, since this method is implemented in a continuous way, linearization of the output signal is obtained in real time, always guaranteeing good measuring accuracy of the inertial sensor.

Finally, it is clear that modifications and variations may be made to what has been described and illustrated herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for compensating non-linearities of a read signal generated by a variable-capacitance inertial sensor, said system comprising:
    an input configured to receive said read signal;
    an identifier circuit configured to identify at least a first nonlinear component of said read signal; and
    a subtractor configured to generate a compensated output signal by subtracting said first nonlinear component from said read signal.

2. The system according to claim 1, wherein the identifier circuit includes:
    a first multiplier configured to generate a first intermediate signal that is a square of said read signal; and
    a second multiplier configured to multiply said first intermediate signal by a first linearization parameter to generate a second intermediate signal corresponding to the first nonlinear component.

3. The system according to claim 1, wherein:
    said read signal is a function of a variation of capacitance between a mobile electrode and first and second fixed electrodes of the inertial sensor, the capacitance being a function of an operative displacement of the mobile electrode with respect to the first and second fixed electrodes along a first sensing axis according to the formula:

$$\Delta C = \frac{\varepsilon_0 A}{(x_0 - x_{offset} - x)} - \frac{\varepsilon_0 A}{(x_0 + x_{offset} + x)}$$

$\varepsilon_0$ is the dielectric constant of vacuum; A is the value of the sum of the areas of the first and second fixed electrodes directly facing the mobile electrode; $x_0$ is a preset distance, considered along the sensing axis, between the first fixed electrode and the mobile electrode; $x_{offset}$ represents a systematic error of displacement that afflicts the preset distance $x_0$; and x is the operative displacement of the mobile electrode with respect to the first fixed electrode; and said first linearization parameter is a function of a ratio between a quadratic component of said read signal and a square of a linear component of said read signal, said linear component being a first derivative of the read signal, and said quadratic component being a function of a second derivative of the read signal.

4. The system according to claim 1, wherein the identifier circuit includes:

a first multiplier configured to generate a first intermediate signal that is a square of said read signal;

a second multiplier configured to multiply said first intermediate signal by a first linearization parameter to generate a second intermediate signal corresponding to the first nonlinear component; and a third multiplier configured to multiply said first intermediate signal by said read signal to generate a third intermediate signal that is the read signal cubed;

a fourth multiplier configured to multiply said third intermediate signal by a second linearization parameter to generate a fourth intermediate signal; and an adder configured to add together said second and fourth intermediate signals to generate a sum signal, wherein the subtractor is configured to generate said compensated output signal by subtracting said sum signal from said read signal.

5. The system according to claim 4, wherein:

said read signal is a function of a variation of capacitance between a mobile electrode and first and second fixed electrodes of the inertial sensor, the capacitance being a function of an operative displacement of the mobile electrode with respect to the first and second fixed electrodes along a first sensing axis according to the formula:

$$\Delta C = \frac{\varepsilon_0 A}{(x_0 - x_{offset} - x)} - \frac{\varepsilon_0 A}{(x_0 + x_{offset} + x)}$$

$\varepsilon_0$ is the dielectric constant of vacuum; A is the value of the sum of the areas of the first and second fixed electrodes directly facing the mobile electrode; $x_0$ is a preset distance, considered along the sensing axis, between the first fixed electrode and the mobile electrode; $x_{offset}$ represents a systematic error of displacement that afflicts the preset distance $x_0$; and x is the operative displacement of the mobile electrode with respect to the first fixed electrode; and said first linearization parameter is a function of a ratio between a quadratic component of said read signal and a square of a linear component of said read signal, said linear component being a first derivative of the read signal, and said quadratic component being a function of a second derivative of the read signal.

6. The system according to claim 1, wherein the identifier circuit includes:

a first multiplier configured to generate a first intermediate signal that is a square of said read signal; and a second multiplier configured to multiply said first intermediate signal by an initial first linearization parameter to generate a second intermediate signal corresponding to the first nonlinear component, the system further comprising:

a re-writeable register configured to store an updating value of said first linearization parameter; and a multiplier configured to multiply the initial value of the first linearization parameter by said updating value for generating the first linearization parameter having an updated value.

7. An electronic device comprising:

a variable-capacitance inertial measurement device including a first fixed electrode and a second fixed electrode and a mobile electrode spatially arranged between the first and second fixed electrodes and capacitively coupled to the first and second fixed electrodes, said inertial measurement device being configured to generate a read signal that is a function of an acceleration to which the inertial measurement device is subject during use; and a compensation system configured to compensate nonlinearities of said read signal, the compensation system being operatively coupled to the inertial measurement device to receive the read signal and generate at output a compensated signal that has a linearized behavior with respect to a behavior of the read signal, compensation system including:

an input configured to receive said read signal;

an identifier circuit configured to identify at least a first nonlinear component of said read signal; and a subtractor configured to generate a compensated output signal by subtracting said first nonlinear component from said read signal.

8. The electronic device according to claim 7, wherein the identifier circuit includes:

a first multiplier configured to generate a first intermediate signal that is a square of said read signal; and a second multiplier configured to multiply said first intermediate signal by a first linearization parameter to generate a second intermediate signal corresponding to the first nonlinear component.

9. The electronic device according to claim 7, wherein:

said read signal is a function of a variation of capacitance between a mobile electrode and first and second fixed electrodes of the inertial sensor, the capacitance being a function of an operative displacement of the mobile electrode with respect to the first and second fixed electrodes along a first sensing axis according to the formula:

$$\Delta C = \frac{\varepsilon_0 A}{(x_0 - x_{offset} - x)} - \frac{\varepsilon_0 A}{(x_0 + x_{offset} + x)}$$

$\varepsilon_0$ is the dielectric constant of vacuum; A is the value of the sum of the areas of the first and second fixed electrodes directly facing the mobile electrode; $x_0$ is a preset distance, considered along the sensing axis, between the first fixed electrode and the mobile electrode; $x_{offset}$ represents a systematic error of displacement that afflicts the preset distance $x_0$; and x is the operative displacement of the mobile electrode with respect to the first fixed electrode; and said first linearization parameter is a function of a ratio between a quadratic component of said read signal and a square of a linear component of said read signal, said linear component being a first derivative of the read signal, and said quadratic component being a function of a second derivative of the read signal.

10. The electronic device according to claim 7, wherein the identifier circuit includes:

a first multiplier configured to generate a first intermediate signal that is a square of said read signal;
a second multiplier configured to multiply said first intermediate signal by a first linearization parameter to generate a second intermediate signal corresponding to the first nonlinear component; and
a third multiplier configured to multiply said first intermediate signal by said read signal to generate a third intermediate signal that is the read signal cubed;
a fourth multiplier configured to multiply said third intermediate signal by a second linearization parameter to generate a fourth intermediate signal; and
an adder configured to add together said second and fourth intermediate signals to generate a sum signal, wherein the subtractor is configured to generate said compensated output signal by subtracting said sum signal from said read signal.

11. The electronic device according to claim 10, wherein:
said read signal is a function of a variation of capacitance between a mobile electrode and first and second fixed electrodes of the inertial sensor, the capacitance being a function of an operative displacement of the mobile electrode with respect to the first and second fixed electrodes along a first sensing axis according to the formula:

$$\Delta C = \frac{\varepsilon_0 A}{(x_0 - x_{offset} - x)} - \frac{\varepsilon_0 A}{(x_0 + x_{offset} + x)}$$

$\varepsilon_0$ is the dielectric constant of vacuum; A is the value of the sum of the areas of the first and second fixed electrodes directly facing the mobile electrode; $x_0$ is a preset distance, considered along the sensing axis, between the first fixed electrode and the mobile electrode; $x_{offset}$ represents a systematic error of displacement that afflicts the preset distance $x_0$; and x is the operative displacement of the mobile electrode with respect to the first fixed electrode; and
said first linearization parameter is a function of a ratio between a quadratic component of said read signal and a square of a linear component of said read signal, said linear component being a first derivative of the read signal, and said quadratic component being a function of a second derivative of the read signal; and
said second linearization parameter is a function of the ratio between a cubic component of said read signal and the cube of the linear component of said read signal, said cubic component being a function of the third derivative of the read signal.

12. The electronic device according to claim 7, wherein the identifier circuit includes:
a first multiplier configured to generate a first intermediate signal that is a square of said read signal; and
a second multiplier configured to multiply said first intermediate signal by an initial first linearization parameter to generate a second intermediate signal corresponding to the first nonlinear component, the system further comprising:
a re-writeable register configured to store an updating value of said first linearization parameter; and
a multiplier configured to multiply the initial value of the first linearization parameter by said updating value for generating the first linearization parameter having an updated value.

* * * * *